(12) United States Patent
Cook et al.

(10) Patent No.: US 10,895,276 B2
(45) Date of Patent: Jan. 19, 2021

(54) TWO MATERIAL JOINT DESIGN

(71) Applicant: Dana Automotive Systems Group, LLC, Maumee, OH (US)

(72) Inventors: Christopher M. Cook, McKenzie, TN (US); Dakota W. Foster, Paris, TN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 402 days.

(21) Appl. No.: 15/899,855

(22) Filed: Feb. 20, 2018

(65) Prior Publication Data

US 2019/0257332 A1 Aug. 22, 2019

(51) Int. Cl.
*F16B 5/07* (2006.01)

(52) U.S. Cl.
CPC .............. *F16B 5/07* (2013.01); *Y10T 403/72* (2015.01)

(58) Field of Classification Search
CPC ........... A47B 47/042; A47B 2230/0081; E04F 2201/028; E06B 3/9845; F16B 5/0012; F16B 5/0016; F16B 5/0052; F16B 5/07; F16B 2012/046; F16B 2012/145; F16B 2012/463; F16B 2012/466; F16B 2200/30; Y10T 403/7094; Y10T 403/7096; Y10T 403/72; Y10T 403/73
USPC ................. 403/381, 382, 401, 403; 52/592.1
See application file for complete search history.

(56) References Cited

U.S. PATENT DOCUMENTS

| | | | |
|---|---|---|---|
| 411,924 A * | 10/1889 | Linderman | F16B 12/46 403/381 |
| 637,212 A * | 11/1899 | McCune | E04B 2/04 52/284 |
| 671,954 A * | 4/1901 | Eaton | F16B 12/46 403/381 |
| 3,193,886 A * | 7/1965 | Wenger | F16B 12/04 403/265 |
| 4,169,604 A | 10/1979 | Heathcott | |
| 4,447,935 A * | 5/1984 | Ausnit | F16B 5/07 160/327 |
| 4,513,770 A | 4/1985 | Davy | |
| 5,667,881 A | 9/1997 | Rasmussen et al. | |
| 6,492,037 B2 | 12/2002 | Shindo et al. | |
| 6,575,471 B1 | 6/2003 | Grosspietsch et al. | |
| 6,817,153 B2 * | 11/2004 | Steinberg | E04F 13/0864 403/401 |
| 7,607,888 B2 | 10/2009 | Hori et al. | |
| 7,818,939 B2 * | 10/2010 | Bearinger | F16B 12/125 403/381 |
| 7,963,178 B2 | 6/2011 | Adami et al. | |
| 9,598,856 B2 * | 3/2017 | Schulte | A47B 47/042 |

(Continued)

FOREIGN PATENT DOCUMENTS

| | | | |
|---|---|---|---|
| DE | 102008051440 A1 * | 3/2010 | ........ E04F 15/02183 |
| DE | 202013100718 U1 * | 3/2013 | ........... A47B 47/042 |

(Continued)

*Primary Examiner* — Josh Skroupa
(74) *Attorney, Agent, or Firm* — Marshall & Melhorn, LLC

(57) ABSTRACT

A two material joint design may be made of a first piece made of a first material. The first piece including a first mating portion of a joint. The design may also have a second piece made of a second material. The second material is different than the first material. The second piece includes a second mating portion of the joint complementary in shape to the first mating portion.

18 Claims, 1 Drawing Sheet

(56) References Cited

U.S. PATENT DOCUMENTS

| | | | |
|---|---|---|---|
| 2003/0150168 A1 | 8/2003 | Van Den Oord | |
| 2004/0012220 A1 | 1/2004 | Huang | |
| 2011/0318096 A1 | 12/2011 | Lausch | |
| 2015/0230600 A1* | 8/2015 | Schulte | A47B 96/201 312/265.5 |
| 2018/0073532 A1* | 3/2018 | Whalen | F16B 5/0012 |
| 2020/0100585 A1* | 4/2020 | Devos | A47B 47/042 |

FOREIGN PATENT DOCUMENTS

| | | | |
|---|---|---|---|
| DE | 102014110123 A1 * | 1/2016 | F16B 12/26 |
| DE | 102015119944 A1 * | 5/2017 | F16B 5/07 |
| EP | 2660483 A1 * | 11/2013 | F16B 5/0016 |

* cited by examiner

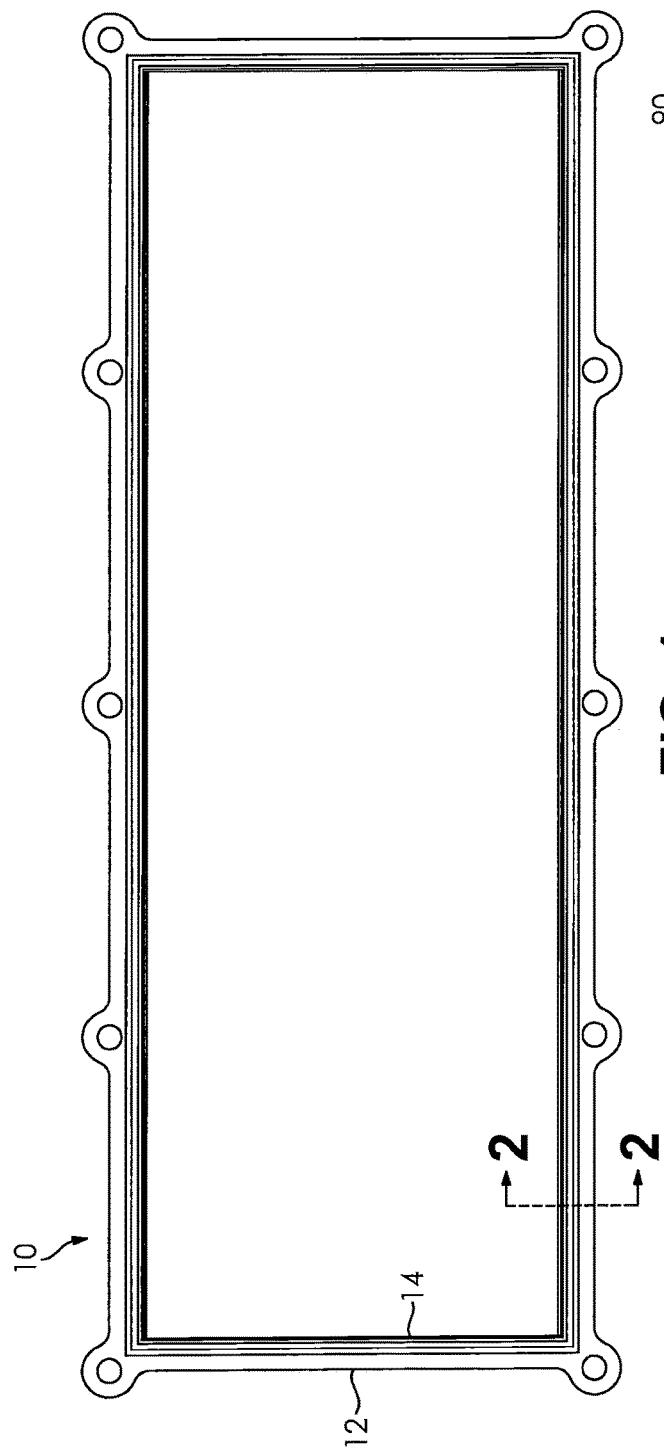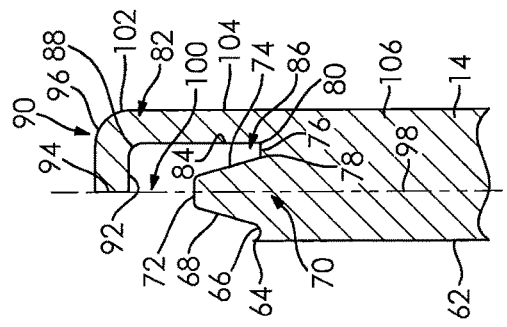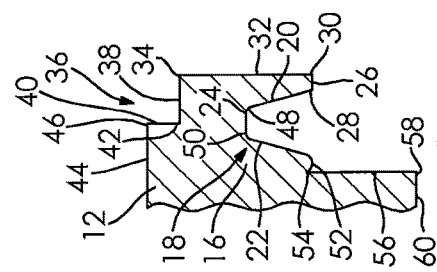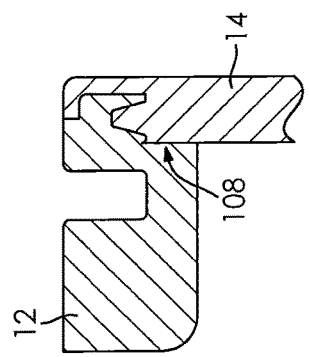

TWO MATERIAL JOINT DESIGN

FIELD

The device relates to a joint design utilizing two materials.

BACKGROUND

Products created of a single material are well known. The single material may be used because of efficiencies in only procuring, handling and creating the product of the single material.

The use of a single material, however, may have disadvantages for products. For example, products constructed of a single material for vehicular components may result in those components being too heavy, costing too much or having strength in areas that is not needed.

Constructing products of two materials is also known. However, challenges often exist in joining the two materials. For example, the joints may not be as strong as the materials themselves, which causes the product to prematurely break. The joints may also not be firm, or secure enough, which can result in undesirable noise and vibration.

In view of the disadvantages of the prior art part designs, it would be advantageous for a product to be constructed of two materials to so that weight and strength efficiencies were maximized for the product. It would also be advantageous for the two materials to be securely and permanently joined to overcome the problems of the prior art designs.

SUMMARY

A two material joint design has a first piece and a second piece. The first piece is made of a first material and the second piece is made of a second material different from that of the first piece. The first piece may have a convex shoulder defined between a crease and a A-shaped female portion. The A-shaped female portion may be located between the shoulder and an end portion. The first piece may also have a first and second leg defining a step portion in the first piece. The second piece may have a concave portion with a complementary shape to the convex shoulder for receiving the convex shoulder. The second piece may also have an A-shaped male portion with a complementary shape to the A-shaped female portion where the A-shaped male portion is received within the A-shaped female portion. The second piece may also have an arm portion that wraps around the first piece and engages the step portion of the first piece.

A further aspect of the design may be that the crease is located between a planar, continuous block wall and the convex shoulder.

A further aspect of the design may be that the A-shaped female portion of the first piece is comprised of a base portion located between a first inner wall and a second inner wall, wherein the first and second inner walls are angled toward the base portion.

A further aspect of the design may be that a planar end portion that is parallel but nonplanar with said base portion is located between the first inner wall and an outer wall of the first piece.

A further aspect of the design may be that the second leg is parallel but nonplanar with the outer wall and wherein the first leg is transverse the second leg and the outer wall but parallel the base portion.

A further aspect of the design may be that the concave portion is located between a mating wall and the A-shaped male portion of the second piece.

A further aspect of the design may be that the A-shaped male portion is defined by the apex portion located between a first outer wall and a second outer wall, wherein the first outer wall and the second outer wall are angled toward the apex portion.

A further aspect of the design may be that a groove is located between the A-shaped male portion and the arm.

A further aspect of the design may be that arm is comprised of a first arm wall, a second arm wall, which are parallel one another, and a flange portion.

A further aspect of the design may be that the flange is comprised of an inner flange wall, an outer flange wall and an end wall, wherein the inner wall and the outer wall are parallel one another and the end wall is transverse the flange walls.

BRIEF DESCRIPTION OF THE DRAWINGS

The above, as well as other advantages, will become readily apparent to those skilled in the art from the following detailed description when considered in the light of the accompanying drawings in which:

FIG. 1 depicts one embodiment of a top plan view of a part comprised of two pieces;

FIG. 2 is a view along line 2-2 of FIG. 1;

FIG. 3 depicts a partial side view of one embodiment of a first piece; and

FIG. 4 depict a partial side view of one embodiment of a second piece.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Turning now to FIG. 1, one embodiment of a part 10 that may utilize the two material joint described herein is depicted. The part 10 depicted in FIG. 1 may be rectangular but it may be other shapes and sizes as well.

Regardless of the shape or size of the part 10, it may be desirable to form the part 10 out of at least two pieces where the two pieces are constructed of different materials. FIG. 2 depicts a preferred embodiment the part 10 created by joining a first piece 12 and a second piece 14.

The first piece 12 may be constructed of a thermoset material. By way of example only, the thermoset material may be such as Bakelite PF-1110. The first piece 12 may be unitary, one piece and integrally formed.

The second piece 14 may be constructed of a thermoplastic material. By way of example only, the thermoplastic material may be such as BASF Ultramid A3WG7. The second piece 14 may be unitary, one piece and integrally formed.

As best seen in FIG. 3, the first piece 12 may have a body portion 16. An A-shaped female portion 18 may extend from the body portion 16. The A-shaped portion 18 may be comprised of a first inner wall 20 and a second inner wall 22. A base portion 24 is located between the first inner wall 20 and the second inner wall 22.

The first inner wall 20 may extend continuously and in a linear fashion from the base portion 24 to an end portion 26. The transition between the first inner wall 20 and the end portion 26 may be a first corner 28. As shown in FIG. 3, it is preferred that the end portion 26 is angled from the first inner wall 20. The end portion 26 may be substantially planar and angled in a single plane.

A second corner 30 defines a transition from the end portion 26 to an outer wall 32. The outer wall 32 may be transverse the end portion 26. The outer wall 32 and the first or second inner wall 20, 22 are not parallel one another. The outer wall 32 may be continuous and planar.

The outer wall 32 transitions at a third corner 34. A step 36 is defined in the body portion 16. The step 34 is opposite the A-shaped portion 18 on the first piece. The step 36 may be L-shaped and comprised of a first leg 38 and a second leg 40. The first leg 38 is non-planar but parallel with the end portion 26. The first leg 38 is also transverse the outer wall 32 and the second leg 40. The second leg 40 and the outer wall 32 may be parallel but non-planar with one another. A transition between the first leg 38 and the second leg 40 defines a fourth corner 42. The first leg 38 may extend inward into the body portion 16. In one embodiment, the first leg 38 may extend at least half way across the A-shaped portion 18.

A transition between the second leg 40 and an upper surface 44 defines a fifth corner 46. The upper surface 44 may be parallel but non-planar with the first leg 38 and the end portion 26. The upper surface 44 may be transverse the second leg 40 and the outer wall 32.

Turning back to the A-shaped portion 18, the first inner wall 20 transitions continuously to the base portion 24. The transition may be such as a curve 48 with a constant radius. In the depicted embodiment, the base portion 24 may extend from the transition in a planar fashion. The plane of the base portion 24 may be parallel but offset from the end portion 26.

The base portion 24 transitions continuously to the second inner wall 20. The first and second inner walls 20, 22 are angled toward the base portion 24. The transition may be such as a curve 50 with a constant radius. The second inner wall 20 may extend continuously and in a linear fashion from the base portion 24 to a shoulder 52. The shoulder 52 may be convex. The shoulder 52 extends to a crease 54. The shoulder 52 in part defines the crease 54.

A block wall 56 extends from, an in part defines, the crease 54. The block wall 56 extends from the crease 54 in a continuous and planar fashion from the crease 54. The block wall 56 may be parallel but nonplanar with the outer wall 32 and the second leg 40.

At a sixth corner 58 the block wall 56 transitions to a lower surface 60. The lower surface 60 may be transverse the block wall 56. The lower surface 60 may be parallel but nonplanar with the base portion 24, the end portion 26, the first leg 38 and the upper surface 44.

Turning now to FIG. 4 the second piece 14 is depicted. The second piece 14 may be defined by a mating wall 62. The mating wall 62 may be continuous, linear and extend in a single plane. The mating wall 62 may be complementary to the block wall 56 in its shape.

The mating wall 62 may extend to a first corner 64. The first corner 64 is located between the mating wall 62 and a concave portion 66. The concave portion 66 may have a radius that is complementary in shape and size to the shoulder 52.

The concave portion 66 continuously transitions to a first outer wall 68 of an A-shaped male portion 70. The first outer wall 68 may extend in a continuous and linear fashion from the concave portion 66 to an apex portion 72. The first outer wall 68 is complementary in shape and size to the second inner wall 22 of the first piece 12. The first outer wall 68 continuously transitions to the apex portion 72.

The apex portion 72 may be angled with respect to the first outer wall 68. The apex portion 72 may be planar. Preferably, it is complimentary in shape and size to the base portion 24.

The apex portion 72 continuously transitions to a second outer wall 74 of the A-shaped male portion 70. The first and second outer wall 68, 74 converge toward the apex portion 72. The second outer wall 74 extends continuously and in a linear fashion from the apex portion 72 to a groove 76.

At least the first outer wall 68, the apex portion 72 and the second outer wall 74 define the A-shaped male portion 70. The first and second outer walls 68, 74 are angled toward the apex portion 72.

The groove 76 is bounded by a second corner 78 and a third corner 80. The groove 76 may be substantially planar and parallel but offset from the apex portion 72. The groove 76 has a complementary size and shape to the end portion 26 on the first piece 12. The groove 76 extends in a continuous and a linear fashion from the second corner 78 to the third corner 80.

An arm portion 82 extends at least partially from the third corner 80. The arm portion 82 may be defined by a first arm wall 84. The first arm wall 84 is separated from the second outer wall 74 by a diverging gap 86 created by the direction of the first arm wall 84. The first arm wall 84 extends in a continuous and linear fashion. In particular, the first arm wall 84 extends above the first and second outer walls 68, 74 as well as the apex portion 72. The first arm wall 84 may be parallel but offset from the mating wall 62. The first arm wall 84 is complementary in shape and size to the outer wall 32 of the first piece 12.

The first arm wall 84 may continuously extend to an inner radiused portion 88. The inner radiused portion 88 transitions to a flange 90.

The flange 90 is defined by an inner flange wall 92, an end wall 94 and an outer flange wall 96. The inner flange wall 92 and the outer flange wall 96 may define a constant thickness between them as they are parallel one another. The inner flange wall 92 and the outer flange wall 96 may be parallel but offset from the apex portion 72. The inner flange wall 92 and the outer flange wall 96 may be transverse the mating wall 62 and the first arm wall 84.

The end wall 94 may be located above the apex portion 72. As shown in FIG. 4, an imaginary line 98 drawn through the end wall 94 may bisect the apex portion 72. A gap 100 may separate the end wall 94, and the flange 90, from the apex portion 72.

The inner flange wall 92 has a complimentary shape and length to the first leg 38 on the first piece 12. The end wall 94 has a complimentary shape and height to the second leg 40 on the first piece 12.

The outer flange wall 96 continuously extends to an outer radiused portion 102. The outer radiused portion 102 transitions the outer flange wall 96 to a second arm wall 104. The second arm wall 104 extends parallel the first arm wall 84 and a constant thickness is defined between them. The first and second arm walls 84, 104, the inner and outer flange walls 92, 96 and the end wall 94 may define the arm portion 82. The arm portion 82 is connected to a base portion 106.

The arm portion 82 and the A-shaped male portion 70 are connected to the base portion 106 of the second piece 14. The mating wall 62 may define one side of the base portion 106.

As noted above and as depicted in the figures, the first and second piece 12, 14 have features that are complementary in shape and size to one another. These features are designed to be located in direct abutment with one another to form a joint 108.

As shown in FIG. 2, the first and second pieces 12, 14 may be joined to one another. In the joined state the mating wall 62 is in direct contact with the block wall 56. The first corner 64 of the second piece 14 is located in the crease 54 of the first piece 12. The shoulder 52 of the first piece 12 fits into the concave portion 66 of the second piece 14 in a male/female relationship. The second inner wall 22 of the first piece 12 is in direct contact with the first outer wall 68 of the second piece 14. The base portion 106 of the first piece 12 receives the apex portion 72 of the second piece 14 in direct abutting contact. The first inner wall 20 of the first piece 12 is in a direct abutting relationship with the second outer wall 74 of the second piece 14. The end portion 26 of the first piece 12 is located in direct contact with the groove 76 of the second piece 14. The outer wall 32 of the first piece 12 is in direct contact with the first arm wall 84 of the second piece 14. The inner flange wall 92 of the second piece 14 is located a direct overlapping relationship with the first leg 38 of the first piece 12. The end wall 94 of the second piece 14 is located in a direct abutting relationship with the second leg 40 of the first piece 12. The upper surface 44 of the first piece 12 is parallel and coplanar with the outer flange wall 96 of the second piece 14.

The above-described elements when located in a direct, abutting relationship with one another lock together and cannot be separated. Further, the above-described elements, being complementary in shape and size to one another, fit together such that there is no relative movement between the first and second parts 12, 14.

At least the elements described above, lock the first and second piece 12, 14 together such that the only way to separate the first and second piece 12, 14 from one another after they are joined is to destroy the joint 108 or the part is.

In accordance with the provisions of the patent statutes, the present device and method has been described in what is considered to represent its preferred embodiments. However, it should be noted that the device and method can be practiced otherwise than as specifically illustrated and described without departing from its spirit or scope.

What is claimed is:

1. A two material joint design, comprising:
   a first piece and a second piece where the first piece is made of a first material and the second piece is made of a second material different than of the first piece;
   wherein the first piece comprises:
      a convex shoulder defined between a crease and an A-shaped female portion,
      wherein the A-shaped female portion is located between the shoulder and an end portion,
      a first and second leg defining a step portion in said first piece,
   wherein the second piece comprises:
      a concave portion with a complementary shape to said convex shoulder for receiving the convex shoulder,
      an A-shaped male portion with a complementary shape to the A-shaped female portion where the A-shaped male portion is received within the A-shaped female portion;
      an arm portion of the second piece that wraps around the first piece and engages the step portion of the first piece so that an end wall of the arm portion is centered above said A-shaped male portion.

2. The two material joint design of claim 1, said crease is located between a planar, continuous block wall and said convex shoulder.

3. The two material joint design of claim 1, wherein said A-shaped female portion of said first piece is comprised of a base portion located between a first inner wall and a second inner wall, wherein said first and second inner walls are angled toward said base portion.

4. The two material joint design of claim 3, wherein a planar end portion that is parallel but nonplanar with said base portion is located between said first inner wall and an outer wall of the first piece.

5. The two material joint design of claim 4, wherein said second leg is parallel but nonplanar with said outer wall and wherein said first leg is transverse said second leg and said outer wall but parallel said base portion.

6. The two material joint design of claim 1, wherein said concave portion is located between a mating wall and said A-shaped male portion of said second piece.

7. The two material joint design of claim 1, wherein said A-shaped male portion is defined by an apex portion located between a first outer wall and a second outer wall, wherein said first outer wall and said second outer wall are angled toward said apex portion.

8. The two material joint design of claim 1, wherein a groove is located between said A-shaped male portion and said arm.

9. The two material joint design of claim 1, wherein said arm is comprised of a first arm wall, a second arm wall, which are parallel to one another, and a flange.

10. The two material joint design of claim 9, wherein said flange is comprised of an inner flange wall, an outer flange wall and an end wall, wherein said inner wall and said outer wall are parallel one another and said end wall is transverse said flange walls.

11. The two material joint design of claim 1, wherein a first inner wall of said A-shaped female portion and an outer wall of first piece defines a tapered portion.

12. The two material joint design of claim 1, wherein said end portion is oriented parallel said first leg on said first piece.

13. The two material joint design of claim 1, wherein said first leg extends at least half way across the A-shaped female portion.

14. The two material joint design of claim 1, wherein a block wall extends from said shoulder on said first piece, said block wall extending parallel the outer wall.

15. The two material joint design of claim 1, wherein a mating wall extends from said concave portion on said second piece, said mating wall extending parallel a second arm wall.

16. A two material joint design, comprising:
   a first piece and a second piece where the first piece is made of a first material and the second piece is made of a second material different than that of the first piece;
   wherein the first piece has a convex shoulder defined between a crease and an A-shaped female portion that fits within a complementary shaped concave portion on the second piece;
   wherein the A-shaped female portion on the first piece that is located between the shoulder and an end portion receives a complementary shaped A-shape male portion on the second piece that is located between the concave portion and a groove; and
   wherein an arm of said second piece has a portion in direct contact with an outer wall of the first piece, wherein said arm at least partially wraps around said first piece over said groove to be received within a step of said first piece.

17. The two material joint design of claim 16, wherein further comprising an imaginary line extending from an end wall of said flange bisects said A-shaped male portion.

18. The two material joint design of claim 16, wherein a second outer wall of said A-shaped male portion and said first arm wall defines a diverging gap between them.

* * * * *